US012361846B2

(12) United States Patent
Estrella

(10) Patent No.: US 12,361,846 B2
(45) Date of Patent: Jul. 15, 2025

(54) ILLUMINATED STREET ADDRESS DISPLAY ASSEMBLY

(71) Applicant: Rolando Estrella, Dracut, MA (US)

(72) Inventor: Rolando Estrella, Dracut, MA (US)

( * ) Notice: Subject to any disclaimer, the term of this patent is extended or adjusted under 35 U.S.C. 154(b) by 193 days.

(21) Appl. No.: 18/219,076

(22) Filed: Jul. 6, 2023

(65) Prior Publication Data

US 2025/0014486 A1 Jan. 9, 2025

(51) Int. Cl.
*G09F 13/04* (2006.01)
*G08C 17/02* (2006.01)

(52) U.S. Cl.
CPC ......... *G09F 13/0477* (2021.05); *G08C 17/02* (2013.01)

(58) Field of Classification Search
CPC .. G09F 13/0477; G09F 27/005; G09F 27/007; G08C 17/02
See application file for complete search history.

(56) References Cited

U.S. PATENT DOCUMENTS

| | | | | |
|---|---|---|---|---|
| 5,435,087 A * | 7/1995 | Karkar | G09F 13/04 | 40/575 |
| 6,799,716 B1 * | 10/2004 | Kuelbs | A47G 29/12095 | 232/39 |
| 7,299,577 B2 | 11/2007 | Bisson | | |
| D825,450 S | 8/2018 | Felder | | |
| 10,593,238 B2 | 3/2020 | Schnell | | |
| 11,948,476 B1 * | 4/2024 | Berg | G06F 3/02 | |
| 2005/0076551 A1 * | 4/2005 | Silverstone | G09F 13/04 | 40/568 |
| 2015/0294603 A1 * | 10/2015 | Braunstein | G09F 7/04 | 315/86 |
| 2019/0272778 A1 * | 9/2019 | Schnell | A47G 29/1209 | |
| 2019/0279541 A1 * | 9/2019 | Garza | G09F 13/0445 | |
| 2021/0056875 A1 * | 2/2021 | Zinsou | G09F 13/04 | |
| 2021/0117915 A1 * | 4/2021 | Newcomb | G09F 7/00 | |
| 2022/0028305 A1 * | 1/2022 | Gardner | G09F 13/0413 | |
| 2024/0071265 A1 * | 2/2024 | Castlen | G09F 27/005 | |
| 2024/0087485 A1 * | 3/2024 | Mattingly | G09F 19/22 | |

FOREIGN PATENT DOCUMENTS

| | | |
|---|---|---|
| WO | WO2021201889 | 10/2021 |

* cited by examiner

*Primary Examiner* — Gary C Hoge

(57) ABSTRACT

An illuminated street address display assembly for facilitating identification of structures includes a display unit and a remote controller. A pair of display panels is positioned on a housing of the display unit. A power module, a transceiver, and a microprocessor are positioned in the housing. Respective indicia, corresponding to a street address of the structure, is displayed on the display panels. The microprocessor is operationally engaged to the power module, the transceiver, and the display panels and thus is enabled to selectively actuate the display panels to display the indicia so that the street address is visible to a user from a street upon which the structure is sited. The remote controller wirelessly controls at least one operational parameter of the display unit.

11 Claims, 6 Drawing Sheets

ILLUMINATED STREET ADDRESS DISPLAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to street address displays and more particularly pertains to a new street address display for facilitating identification of structures. The present invention discloses a street address on display panels and which incorporates communication features.

(2) Description of Related Art Including Information Disclosed Under 37 CFR 1.97 and 1.98

The prior art relates to street address display, which comprise illuminated street address displays that are solar powered and remote controlled. What is lacking in the prior art is a street address display comprising a microphone and speaker, along with a remote controller, which enables two-way communication between an operator, such as a homeowner, and a user, such as a delivery agent.

BRIEF SUMMARY OF THE INVENTION

An embodiment of the disclosure meets the needs presented above by generally comprising a display unit and a remote controller. The display unit comprises a housing, which defines an interior space. A pair of display panels is positioned on the housing. A power module, a transceiver, and a microprocessor are attached to the housing and are positioned in the interior space. The display panels display indicia, corresponding to a street address of the structure. The microprocessor is operationally engaged to the power module, the transceiver, and the display panels and thus is enabled to selectively actuate display panels so that the street address is visible to a user from a street upon which the structure is sited. The remote controller is in communicative engagement with the microprocessor and is configured to wirelessly control at least one operational parameter of the display unit.

Another embodiment of the disclosure includes a system comprising a structure to which a display unit, as described above, is attached. A remote controller of the assembly is in communicative engagement with the microprocessor of the display unit and is configured to wirelessly control at least one operational parameter of the display unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
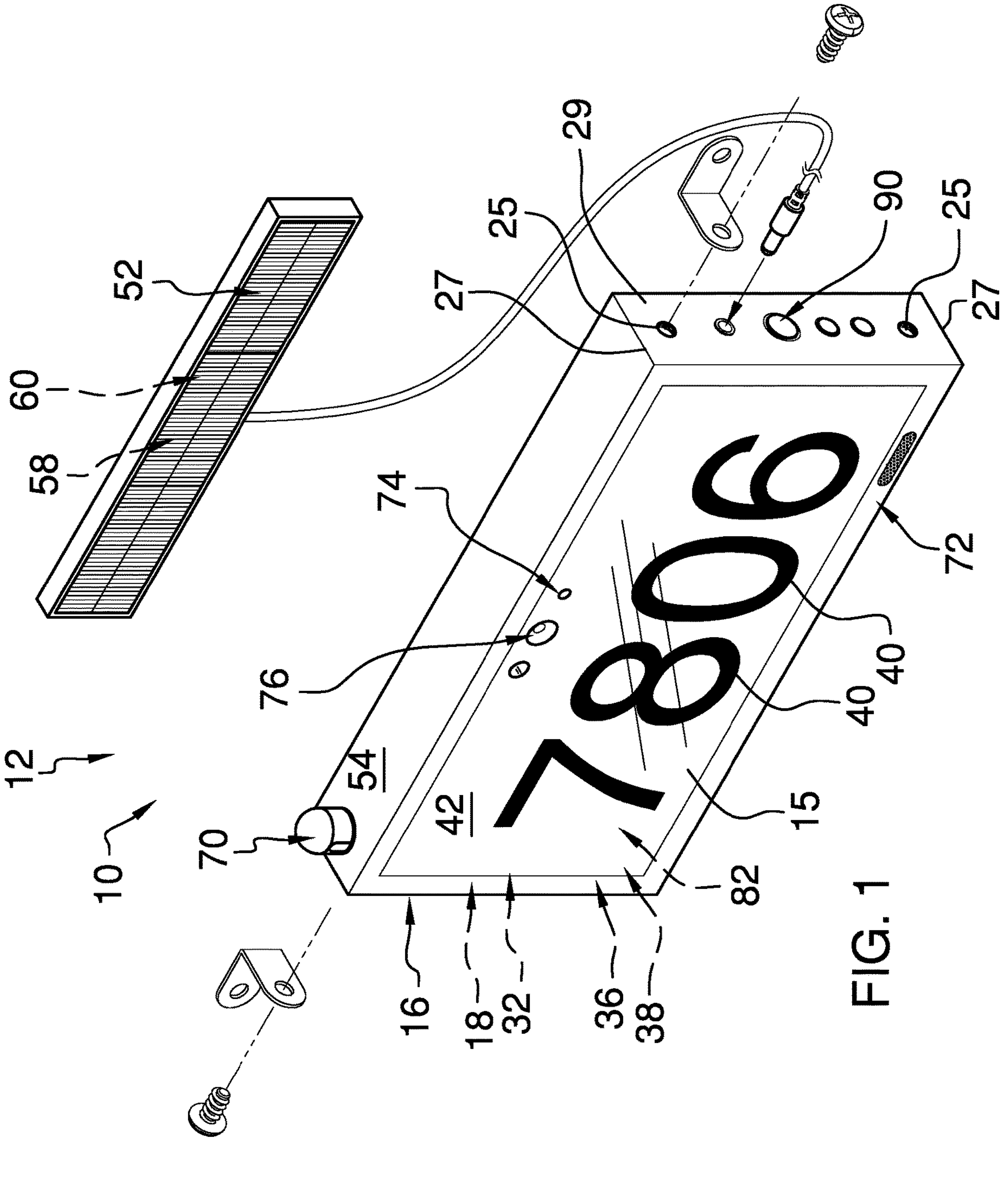
FIG. 1 is a front isometric perspective view of an illuminated street address display assembly according to an embodiment of the disclosure.

With reference now to the drawings, and in particular to FIGS. 1 through 6 thereof, a new street address display embodying the principles and concepts of an embodiment of the disclosure and generally designated by the reference numeral 10 will be described.

Figure 5:
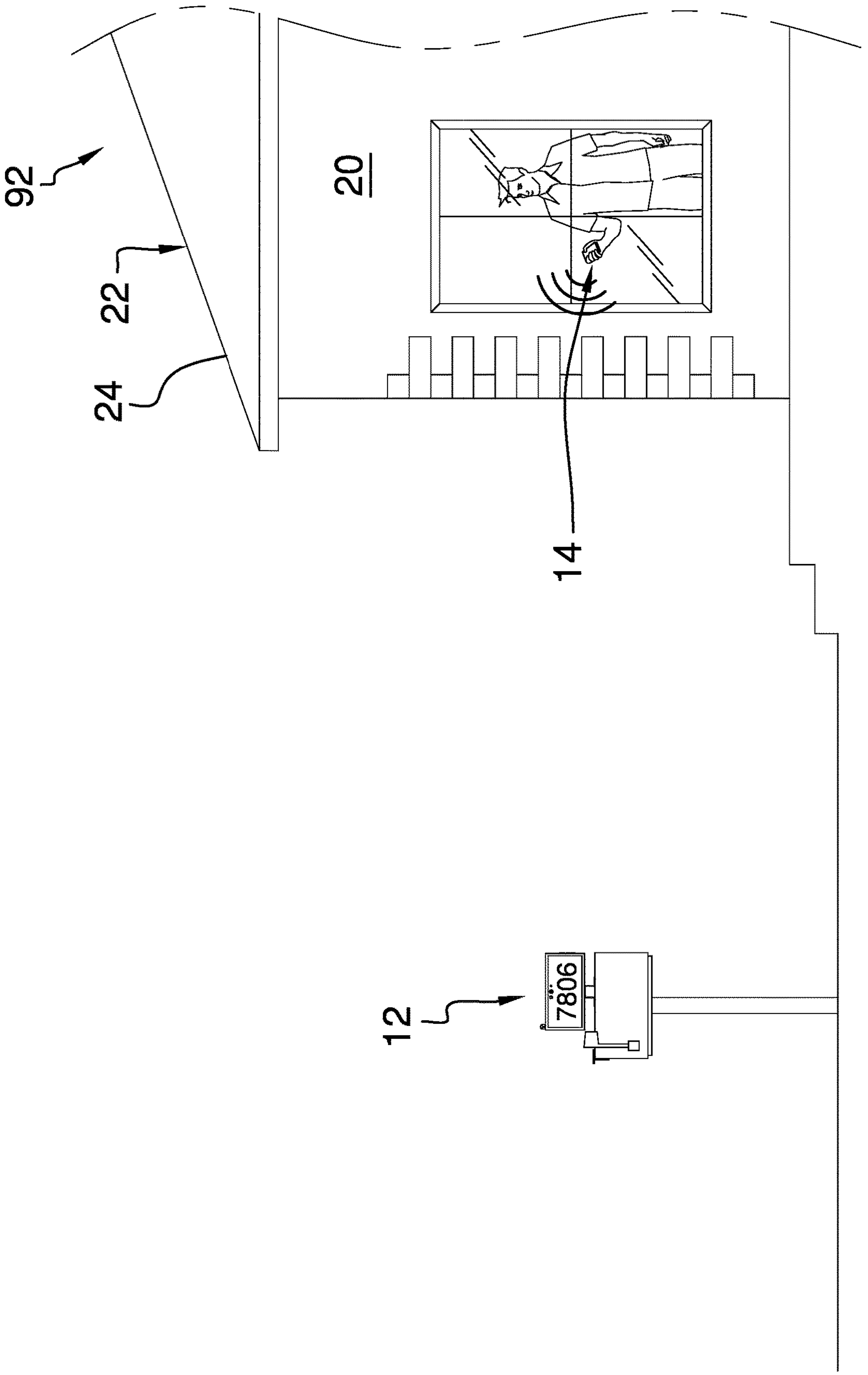
FIG. 5 is an in-use view of an embodiment of the disclosure.
Figure 6:
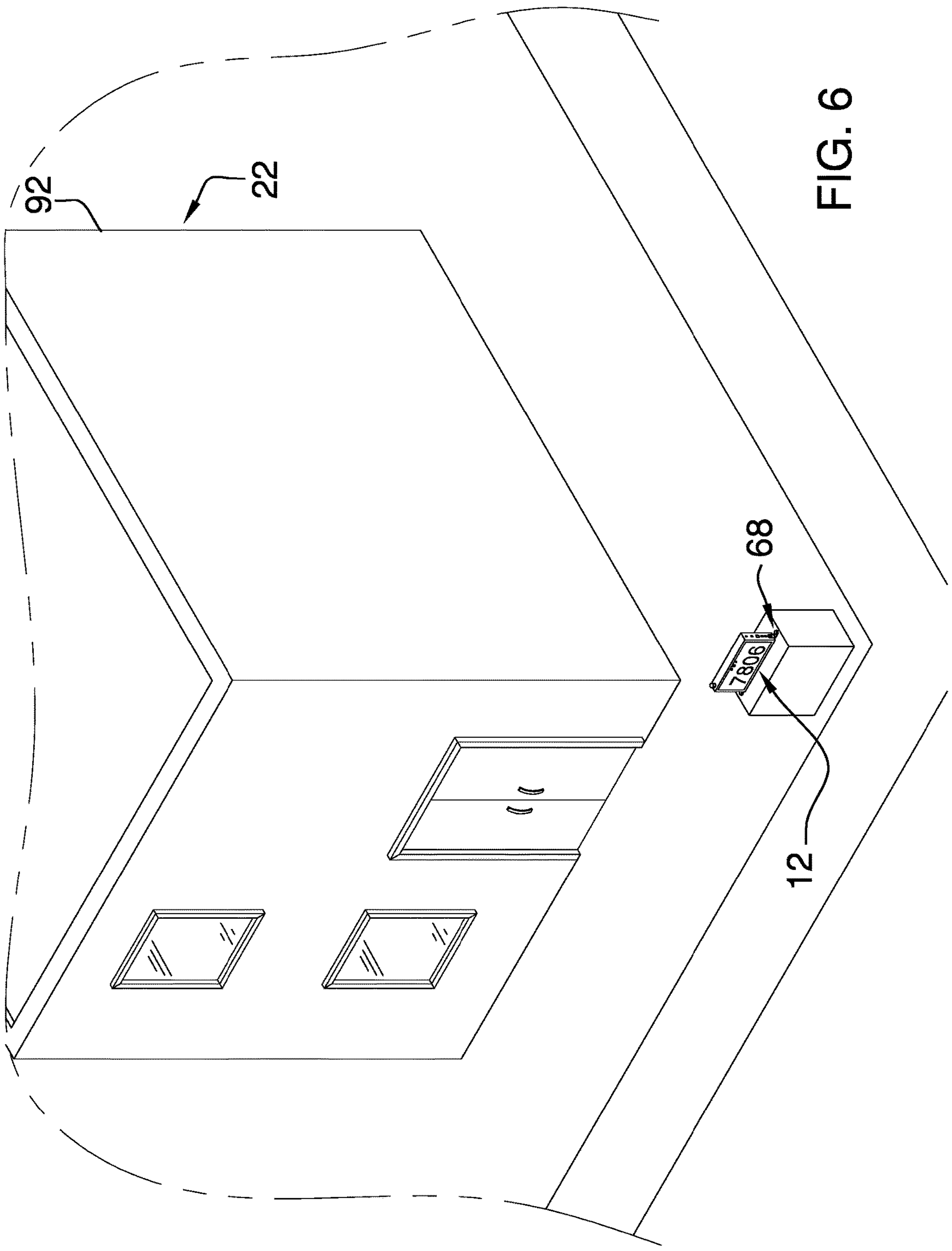
FIG. 6 is an in-use view of an embodiment of the disclosure.

As best illustrated in FIGS. 1 through 6, the illuminated street address display assembly 10 generally comprises a display unit 12 and a remote controller 14. The display unit 12 comprises a housing 16, which defines an interior space 18 and which is substantially impervious to water. As shown in FIGS. 5 and 6, the housing 16 is configured to be selectively mountable to an exterior surface 20 of a structure 22, such as a house 24, business, or the like.

The housing 16 is configured for attachment in a variety of ways. A plurality of threaded apertures 25 is provided in the housing 16. Each threaded aperture 25 is positioned adjacent to a corner 27 of the housing 16 along a lateral side 29 of the housing 16. A fastener 26 is insertable through a flange 31 of an L-shaped bracket 33 to attach the bracket 33 to the housing 16. A second flange 35 of the bracket 33 has an aperture 37 for use of another fastener 26 to attach the housing 16 to the structure 22. The bracket 33 can be turned such that the second flange 35 is aligned with a back face 28 of the housing 16, a top face 54 of the housing 16, or a front face 42 of the housing 16. A threaded hole 43 is provided on a bottom 45 of the housing 16. The threaded hole 43 can be engaged by another fastener 26 or directly to a complementarily threaded top of a post. A U-shaped bracket 49 can be attached to the housing 16 using the threaded hole 43. Each section 51 of the bracket 49 may have a hole 53 to provide for various connections to an extrinsic structure using the bracket 49 and fasteners 26. The bracket 49 can also be used with the threaded apertures 25 for spacing the housing 16 from the structure 22 if desired.

Figure 2:
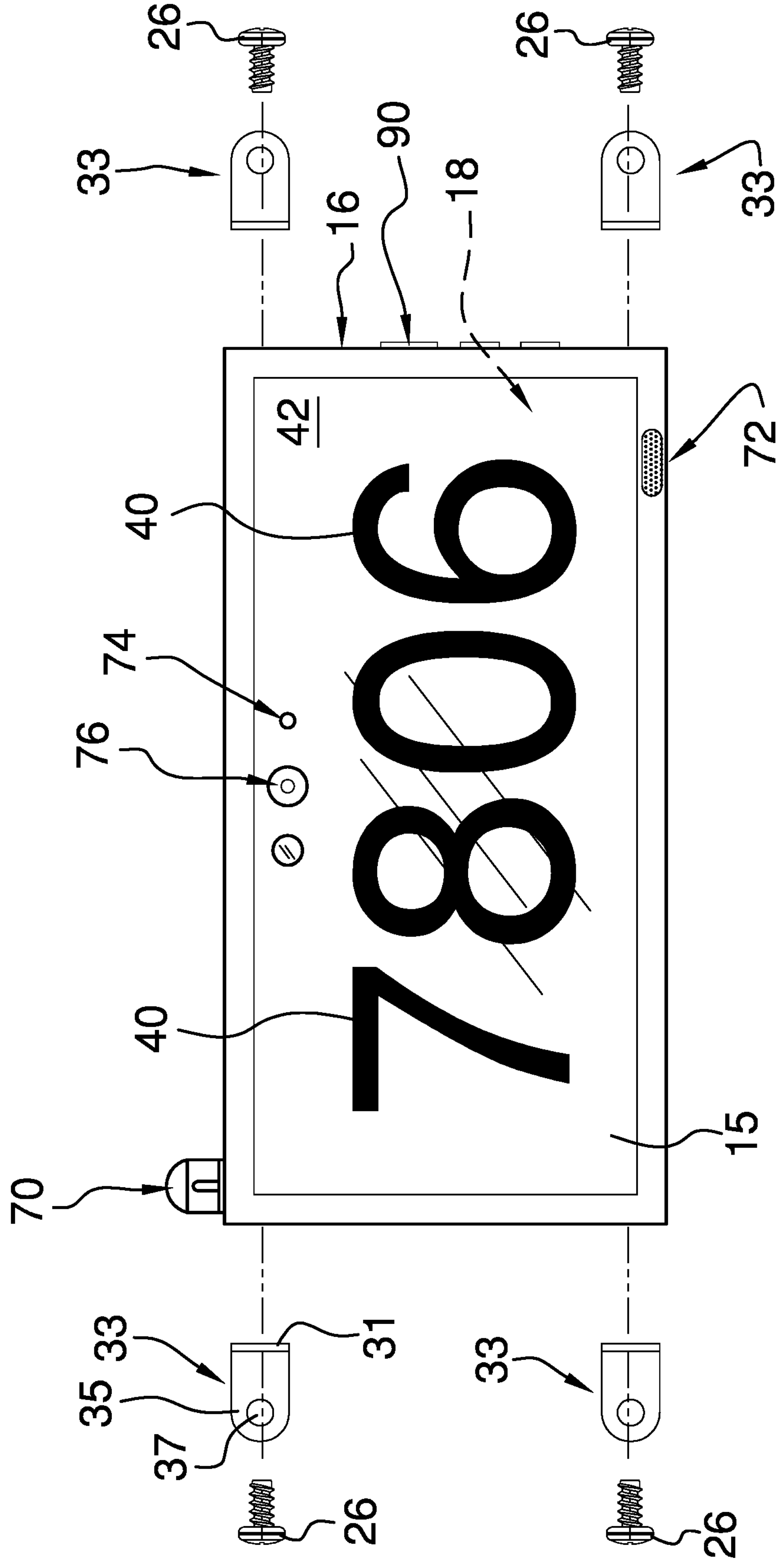
FIG. 2 is a front view of an embodiment of the disclosure.
Figure 3:
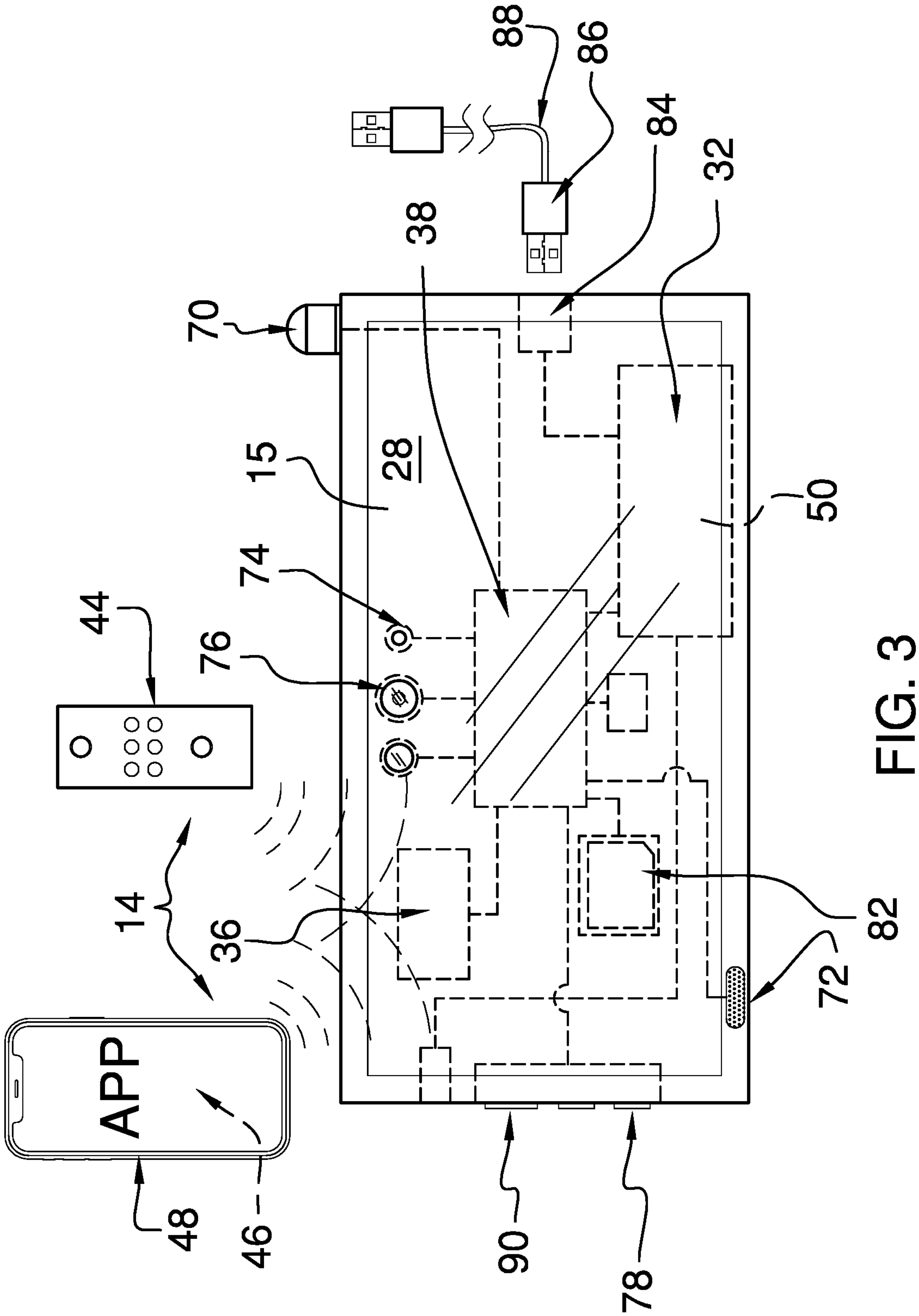
FIG. 3 is a rear view of an embodiment of the disclosure.
Figure 4:
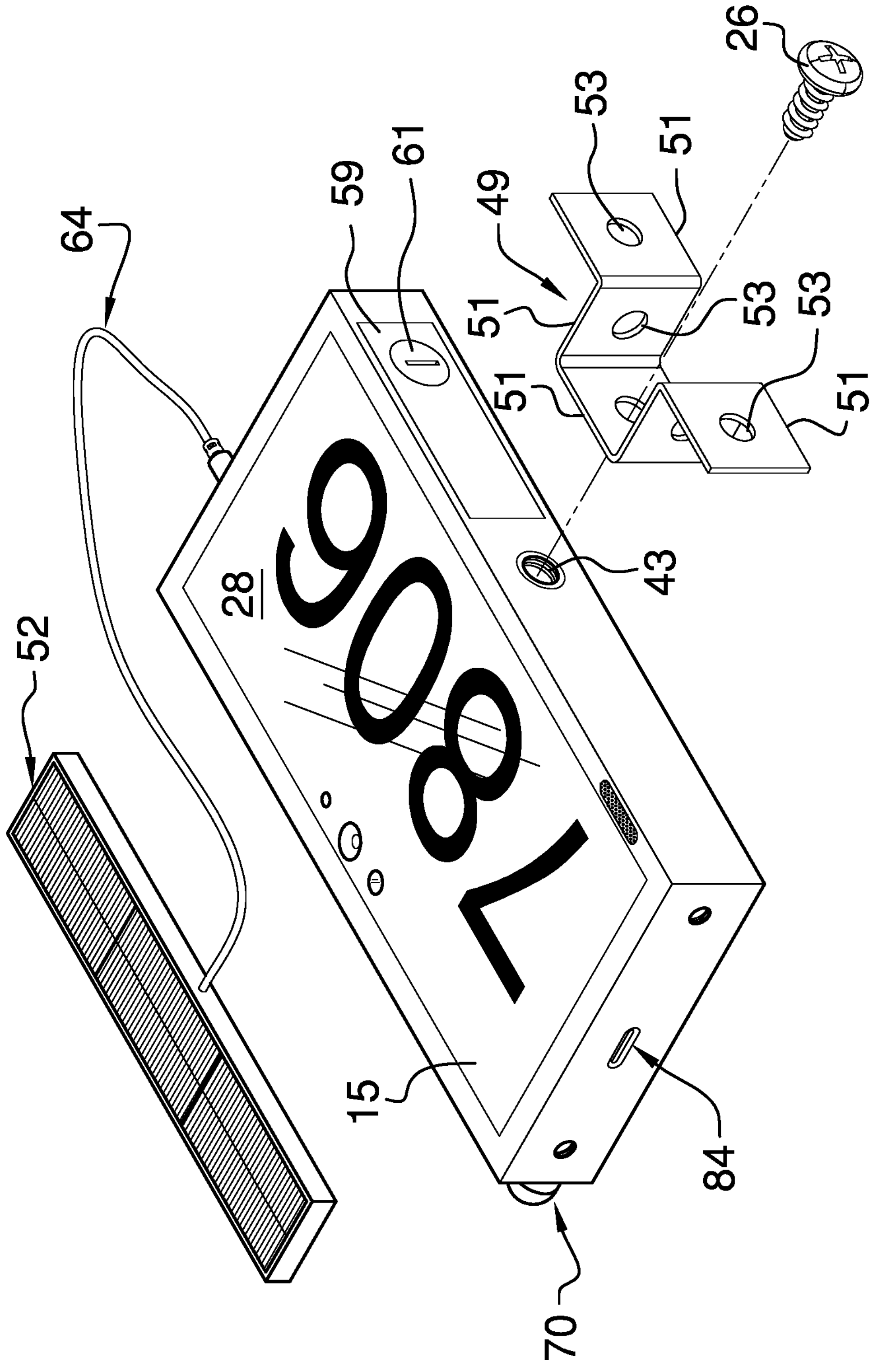
FIG. 4 is a rear isometric perspective view of an embodiment of the disclosure.

A power module 32, a transceiver 36, and a microprocessor 38 are attached to the housing 16 and are positioned in the interior space 18. Respective display panels 15 are positioned on the front face 42 and the back face 28. Each display panel 15 can display indicia 40 of a house/address number. The indicia 40 may alternately show a name, words, or other pictures, if desired. The microprocessor 38 is operationally engaged to the power module 32, the transceiver 36, and the display panels 15 and thus is enabled to selectively actuate the display panels 15 to display the indicia 40 so that the street address is visible to a user from a street upon which the structure 22 is sited. The front face 42 is shown in FIGS. 1 and 2 particularly. The back face 28 would be a mirror image including the same functional elements as shown in FIGS. 1 and 2. The remote controller 14 is in communicative engagement with the microprocessor 38 and is configured to wirelessly control at least one operational parameter of the display unit 12. The remote controller 14 may comprise one of both of a dedicated remote 44 and programming code 46, which is selectively positionable on an electronic device 48 of the operator.

The power module 32 comprises a battery 50, which is rechargeable and accessible through a battery cover 59. The battery cover 59 may include a lock 61 to restrict access to the battery 50. A solar panel 52 is attached to the top face 54 of the housing 16 and is operationally engaged to the battery 50. The solar panel 52 is configured to convert electromagnetic radiation to direct current to charge the battery 50. The present invention also anticipates the power module 32 comprising a connection to an electrical circuit of the structure 22.

The solar panel 52 may be attached to the housing 16 directly in a fixed position of alternatively by means of a solar panel port 58 and a power cable 64. The power cable 64 may further operationally engage the solar panel 52 and the microprocessor 38. The power cable 64 is selectively positionable relative to the housing 16 so that the solar panel 52 is selectively positionable spaced from the housing 16. The housing 16 and the solar panel 52 thus are mountable to the structure 22 in a variety of configurations, two of which are shown in FIGS. 5 and 6. In FIG. 5, the housing 16 is mounted directly to the structure 22 and the solar panel 52 is mounted directly to the housing 16. In FIG. 6, the housing 16 is mounted to a plate 68, which in turn is mounted to the structure 22. The solar panel 52 is extended by the power cable 64 from the housing 16 and is mounted directly to the structure 22 using the plurality of first couplers 58. Such an arrangement might be used, for example, to optimize exposure of the solar panel 52 to electromagnetic radiation. A power port 13 may also be positioned on the housing 16 to allow for direct connection to an electrical outlet using a conventional power cord.

A photodetector 70 is attached to the housing 16 and is operationally engaged to the microprocessor 38. The photodetector 70 is configured to detect light and to signal the microprocessor 38, enabling the microprocessor 38 to selectively actuate the display panels 15 at a predetermined level of brightness when the photodetector 70 detects a specified level of light. Thus, the street address is visible at night, dusk, dawn, heavy cloud cover, and the like, but the battery 50 is not depleted by powering of the display panels 15 at a level not warranted given the amount of ambient light. The present invention is anticipated to be useful to users, such as delivery agents, for whom rapid identification of street addresses facilitates completion of their work in a timely manner.

A speaker 72 is attached to the housing 16, is positioned in the interior space 18, and is operationally engaged to the microprocessor 38. A microphone 74 is attached to the housing 16 and is operationally engaged to the microprocessor 38. The microphone 74 and the speaker 72 enable two-way communication between an operator, such as a homeowner, and the user. The display unit 12 also may comprise a camera 76, which is attached to the housing 16 and which is operationally engaged to the microprocessor 38. The camera 76 is configured to capture an image of the user, enabling the microprocessor 38 to relay the image to the operator via the transceiver 36. The present invention anticipates the camera 76 capturing video images for transmission to the remote controller 14, allowing the operator to view events proximate to the camera 76. Further, a motion sensor 77 may be provided on the housing 16 and operationally coupled to the microprocessor 38 to either actuate or brighten the display panels 15 when motion is detected.

A notification switch 78 is attached to the housing 16 and is operationally engaged to the microprocessor 38. The notification switch 78 is configured to be switched by the user to notify the operator, via the remote controller 14, of the user's presence.

A data storage module 82 attached to the housing 16, is positioned in the interior space 18, and is operationally engaged to the microprocessor 38. The data storage module 82 is configured to store communications between the operator and the user, as well as images captured by the camera 76. A port 84 is attached to the housing 16 and is operationally engaged to the microprocessor 38. The port 84 is configured to engage a plug 86 of a data transfer cable 88 to allow for transfer of files from the data storage module 82 to the electronic device 48 of the operator.

The present invention also anticipates a power switch 90 attached to the housing 16 and operationally engaged to the microprocessor 38 and to the battery 50, allowing the operator to manually power on and to power off the display unit 12.

Another embodiment of the disclosure includes a system 92 comprising a structure 22 to which a display unit 12, as described above, is attached. A remote controller 14 of the assembly 92 is in communicative engagement with a microprocessor 38 of the display unit 12 and is configured to wirelessly control at least one operational parameter of the display unit 12.

In use, the housing 16 is mounted to the structure 22 so that it is viewable from the street. The display panels 15 display the indicia 40 so that the street address is visible to a user from the street. The operator and the user can converse via the microphone 74, the speaker 72, and the remote controller 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated street address display assembly comprising:
- a display unit comprising:
  - a housing defining an interior space, the housing being configured to be selectively mountable to an exterior surface of a structure, a front face of the housing being substantially transparent,
  - a power module attached to the housing and positioned in the interior space,
  - a pair of display panels, each display panel being positioned on said housing, each display panel displaying indicia corresponding to a street address of the structure,
  - a microprocessor attached to the housing and positioned in the interior space, the microprocessor being operationally engaged to the display panels and the power module, such that the microprocessor is enabled for selectively actuating the display panels, such that the street address is visible to a user from a street upon which the structure is sited, and
  - a transceiver attached to the housing, positioned in the interior space, and operationally engaged to the microprocessor; and
- a remote controller in communicative engagement with the microprocessor and being configured for wirelessly controlling at least one operational parameter of the display unit;
- a camera attached to the housing and operationally engaged to the microprocessor, wherein the camera is configured for capturing an image of the user, enabling the microprocessor to relay the image to the operator via the transceiver: and
- a data storage module attached to the housing, positioned in the interior space. and operationally engaged to the microprocessor, wherein the data storage module is configured for storing communications between the operator and the user and images captured by the camera.

2. The illuminated street address display assembly of claim 1, wherein the housing is substantially impervious to water.

3. The illuminated street address display assembly of claim 1, further comprising:
- a threaded aperture in the housing; and
- an L-shaped bracket attachable to the housing by a fastener engaged to the threaded aperture in the housing wherein the housing is configured for being secured to the structure by another fastener inserted through the L-shaped bracket.

4. The illuminated street address display assembly of claim 3, further comprising:
- the threaded aperture is one of a plurality of threaded apertures, each threaded aperture being positioned proximate a respective corner of the housing along an associated lateral side of the housing; and
- the L-shaped bracket being one of a plurality of L-shaped brackets, each L-shaped bracket being securable to the housing using a respective one of the plurality of threaded apertures.

5. The illuminated street address display assembly of claim 1, further including:
- the power module comprising a battery, the battery being rechargeable; and
- a solar panel operationally engaged to the battery, wherein the solar panel is configured for converting electromagnetic radiation to direct current for charging the battery.

6. The illuminated street address display assembly of claim 5, further comprising a power cable operationally engaged to and extending between the solar panel and the microprocessor, the power cable being selectively extensible from the housing, such that the solar panel is selectively separable from the housing.

7. The illuminated street address display assembly of claim 1, further including a photodetector attached to the housing and operationally engaged to the microprocessor, wherein the photodetector is configured for detecting light and signaling the microprocessor, enabling the microprocessor for selectively actuating the display panels when the photodetector detects a specified level of light.

8. The illuminated street address display assembly of claim 1, further including:
- a speaker attached to the housing, positioned in the interior space, and operationally engaged to the microprocessor; and
- a microphone attached to the housing and operationally engaged to the microprocessor, wherein the microphone and the speaker enable two-way communication between an operator and the user.

9. The illuminated street address display assembly of claim 1, further including a port attached to the housing and operationally engaged to the microprocessor, wherein the port is configured for engaging a plug of a data transfer cable for transferring files from the data storage module to an electronic device of the operator.

10. The illuminated street address display assembly of claim 1, wherein the remote controller comprises one of both of a dedicated remote and programming code selectively positionable on an electronic device of the operator.

11. An illuminated street address display assembly comprising:
- a display unit comprising:
  - a housing defining an interior space, the housing being configured to be selectively mountable to an exterior surface of a structure, a front face of the housing being substantially transparent, the housing being substantially impervious to water,
  - a fastener attached to a back face of the housing and being configured for attaching the housing to the exterior surface of the structure, the fastener comprising a plurality of keyhole slots, wherein each keyhole slot is configured for interion of a head of a respective article of mounting hardware for mounting the housing to the structure, a power module attached to the housing and positioned in the interior space, the power module comprising a battery, the battery being rechargeable, a solar panel operationally engaged to the battery, wherein the solar panel is configured for converting electromagnetic radiation to direct current for charging the battery, a pair of display panels, each display panel being positioned on said housing, each display panel displaying corresponding to a street address of the structure, a plurality of threaded apertures in the housing, each threaded aperture being positioned proximate a respective corner of the housing along an associated lateral side of the housing;

a plurality of L-shaped brackets, each L-shaped bracket being attachable to the housing by a fastener engaged to the threaded aperture in the housing wherein the housing is configured for being secured to the structure by another fastener inserted through the L-shaped bracket, a microprocessor attached to the housing and positioned in the interior space, the microprocessor being operationally engaged to the display panels and the power module, such that the microprocessor is enabled for selectively actuating the display panels, such that the street address is visible to a user from a street upon which the structure is sited, a power cable operationally engaged to and extending between the solar panel and the microprocessor, the power cable being selectively extensible from the housing, such that the solar panel is selectively separable from the housing, a photodetector attached to the housing and operationally engaged to the microprocessor, wherein the photodetector is configured for detecting light and signaling the microprocessor, enabling the microprocessor for selectively actuating the plurality of bulbs when the photodetector detects a specified level of light, a transceiver attached to the housing, positioned in the interior space, and operationally engaged to the microprocessor, a speaker attached to the housing, positioned in the interior space, and operationally engaged to the microprocessor, a microphone attached to the housing and operationally engaged to the microprocessor, wherein the microphone and the speaker enable two-way communication between an operator and the user, a camera attached to the housing and operationally engaged to the microprocessor, wherein the camera is configured for capturing an image of the user, enabling the microprocessor to relay the image to the operator via the transceiver, a data storage module attached to the housing, positioned in the interior space, and operationally engaged to the microprocessor, wherein the data storage module is configured for storing communications between the operator and the user and images captured by the camera, and a port attached to the housing and operationally engaged to the microprocessor, wherein the port is configured for engaging a plug of a data transfer cable for transferring files from the data storage module to an electronic device of the operator; and a remote controller in communicative engagement with the microprocessor and being configured for wirelessly controlling at least one operational parameter of the display unit, the remote controller comprising one of both of a dedicated remote and programming code selectively positionable on an electronic device of the operator.

* * * * *